United States Patent [19]
Lundqvist

[11] 4,432,029
[45] Feb. 14, 1984

[54] PROTECTIVE MEANS FOR SERIES CAPACITORS

[75] Inventor: Bertil Lundqvist, Västeras, Sweden
[73] Assignee: Asea Aktiebolag, Västeras, Sweden
[21] Appl. No.: 394,810
[22] Filed: Jul. 2, 1982
[30] Foreign Application Priority Data Jul. 6, 1981 [SE] Sweden .............................. 8104184

[51] Int. Cl.³ .............................................. H02H 7/16
[52] U.S. Cl. ........................................ 361/16; 361/57; 361/94; 361/103; 361/105
[58] Field of Search ...................... 361/16, 15, 17, 56, 361/57, 93, 94, 96, 97, 103, 105, 110, 127, 126; 338/20, 21, 92, 277

[56] References Cited
U.S. PATENT DOCUMENTS

| | | | |
|---|---|---|---|
| 3,656,045 | 4/1972 | Frezzolini et al. | 361/105 X |
| 3,670,175 | 6/1972 | Petersen et al. | 307/64 |
| 3,707,650 | 12/1972 | Innis et al. | 361/94 X |
| 4,002,948 | 1/1977 | Gary et al. | 361/96 X |
| 4,121,270 | 10/1978 | Peterson | 361/16 X |
| 4,174,529 | 11/1979 | Hamann | 361/16 |
| 4,259,704 | 3/1981 | Hamann | 361/16 |

Primary Examiner—Patrick R. Salce
Attorney, Agent, or Firm—Watson, Cole, Grindle & Watson

[57] ABSTRACT

A protective means for a series capacitor in a high-voltage network comprises a voltage-dependent resistor (varistor) arranged in parallel with the series capacitor, a spark gap arranged in parallel with the varistor for shunting the latter when it becomes overloaded, a current-sensing member, for example a current transformer, for sensing the current through the varistor, an energy absorption detector for sensing the temperature of the varistor, and a pulse transformer electrically or magnetically connected to the current-sensing member, for triggering the spark gap. During normal operation of the network and the series capacitor the current-sensing member is short-circuited by a normally closed switching device. This switching device is controlled by the energy absorption detector in such a way that the switching device is opened if the temperature of the varistor exceeds a predetermined level, whereby a trigger pulse, generated directly by the varistor current via the current-sensing member and the pulse transformer, may pass to the spark gap.

10 Claims, 4 Drawing Figures

PROTECTIVE MEANS FOR SERIES CAPACITORS

TECHNICAL FIELD

This invention relates to a protective means for a series capacitor in a high-voltage network, the protective means being of the kind comprising a voltage-dependent resistor arranged in parallel with the series capacitor, a triggered spark gap arranged in parallel with the resistor, for shunting the resistor in case of overload thereof, a current-sensing member for sensing the current through the resistor, an energy absorption detector for direct or indirect sensing of the temperature of the resistor, and a pulse transformer for triggering the spark gap.

BACKGROUND ART

When a series capacitor bank in a high-voltage network is provided with an overvoltage protection device employing a zinc oxide (ZnO) voltage-dependent resistor (varistor), there is a need to trigger a parallel spark gap when the varistor has been utilized to its thermal limit value. To reduce the cost of the voltage-dependent resistor, it is dimensioned in such a way that it is only able to absorb a limited amount of energy. When the absorbed energy exceeds the level specified in advance by this dimensioning, the parallel spark gap is activated, which spark gap is then extinguished by external current interruption or by-passing.

Different trigger devices for a protective spark gap of the kind just described are known. They are based on electrical energy being stored, for example in a capacitor, which is charged via line current supply devices with battery back-up. See, for example, U.S. Pat. Nos. 3,670,175 and 4,174,529.

An object of the present invention is to provide a protective means of the kind referred to in which triggering of the protective spark gap does not require any separate energy supply.

DISCLOSURE OF THE INVENTION

According to the invention, a protective means for a series capacitor in a high-voltage network comprises a voltage-dependent resistor arranged in parallel with said capacitor, a spark gap arranged in parallel with said resistor for shunting the latter in case of overload thereof, a current-sensing member for sensing the current through said resistor, an energy absorption detector for sensing the temperature of said resistor, and a pulse transformer electrically or magnetically connected to said current-sensing member, for triggering said spark gap, said current-sensing member, during normal operation, being short-circuited by a switching device which is controlled by said detector in such a way that the switching device is opened if the temperature of said resistor exceeds a predetermined level, whereby a trigger pulse, generated directly by the resistor current via said current-sensing member and said pulse transformer, may pass to said spark gap.

In a protective means in accordance with the invention, the current flowing through the voltage-dependent resistor is utilized directly for generating, via the current transformer and the pulse transformer, a high-voltage pulse for triggering the spark gap. During normal operation, the current transformer and the pulse transformer are short-circuited by the switching device, which is controlled directly or indirectly by the temperature of the voltage-dependent resistor. When this temperature exceeds a predetermined level, the switching device is opened and a trigger pulse may pass to the spark gap. Since the current through the voltage-dependent resistor is used for generating the trigger pulse, the advantage is obtained that no separate energy supply is needed. A further advantage is that the trigger pulse is automatically synchronized with the peak value of the mains frequency voltage across the spark gap and has the same polarity as this, thus obtaining a more reliable ignition of the gap.

An additional advantage of the protective means in accordance with the invention is that two conditions have to be fulfilled in order that a high-voltage pulse may be delivered, namely (a) that the energy absorption detector gives a tripping signal, i.e. the thermal charging limit of the voltage-dependent resistor has been reached, and (b) that current flows through the voltage-dependent resistor.

This means that the spark gap can only be triggered during an actual fault condition in the high-voltage network.

BRIEF DESCRIPTION OF DRAWINGS

The invention will now be described in greater detail, by way of example, with reference to the accompanying drawings, in which.

DESCRIPTION OF PREFERRED EMBODIMENTS

Figures 1, 2:
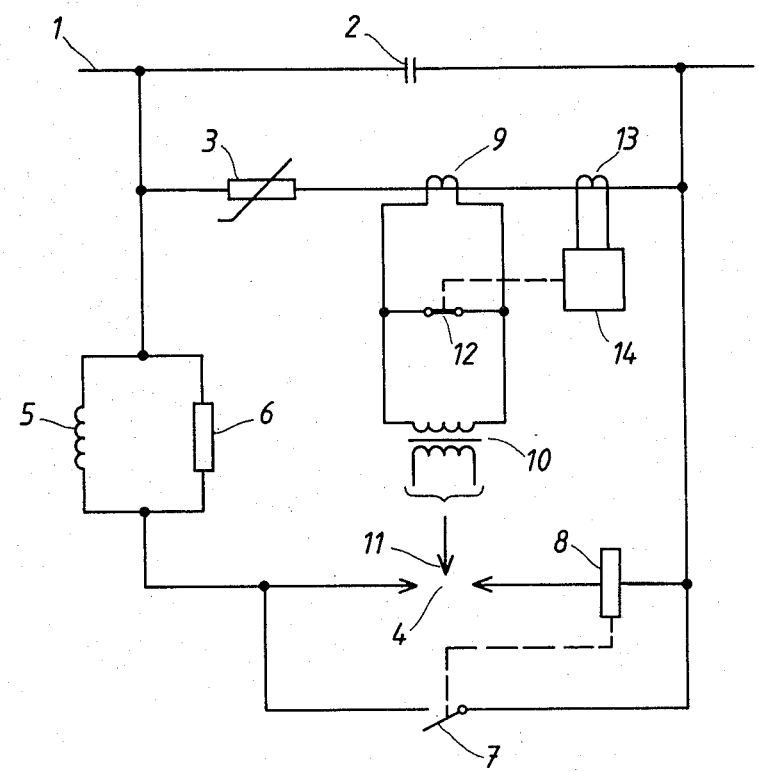
FIG. 1 is a circuit diagram illustrating the principle of a protective means in accordance with the invention.
FIG. 2 is a circuit diagram of one embodiment of a trigger device, included in the protective means of FIG. 1, with a mechanical switching member.

FIG. 1 shows a protective circuit for a series capacitor bank 2 connected into a high-voltage line 1. A varistor (i.e. voltage-dependent resistor) 3 is connected in parallel across the capacitor bank 2 to protect the latter from harmful overvoltages which may occur, for example as a result of a short-circuit on the high-voltage line 1. The varistor 3 is built up of a large number of series- and/or parallel-connected ZnO varistor blocks. A spark gap 4, triggered by force, is connected in parallel across the varistor 3 to shunt the latter when the varistor has been utilized to its thermal limit value. In series with the spark gap 4 there is connected a parallel connection of a reactor 5 and a resistor 6 to limit the amplitude of the capacitor current when the spark gap ignites. In parallel with the spark gap 4 there is a by-pass circuit breaker 7, the control device 8 of which is influenced by the spark gap current. In this way the circuit-breaker 7 will close, with consequent extinguishing of the spark gap 4, a certain time after the spark gap has been ignited.

For the purpose of triggering the spark gap 4, there is provided a trigger device which utilizes the current through the varistor 3. The trigger device comprises a current transformer 9, the primary winding of which receives the current flowing through the varistor 3 and the secondary winding of which is connected to a pulse transformer 10 which delivers a trigger signal, in the form of a high-voltage pulse, to an ignition gap 11. The trigger signal is, however, delayed by the trigger circuit being short-circuited by a switching device 12, which is controlled directly or indirectly by the temperature of the varistor 3. In the embodiment shown in FIG. 1, the switching device 12 is controlled directly from the varistor current via a second current transformer 13 and an energy absorption detector 14. When the varistor temperature exceeds a predetermined level, the switching device 12, which may consist of a bimetallic relay, is opened so that a trigger signal may pass to the ignition gap 11.

FIG. 2 shows an embodiment of the trigger device in which the switching device 12 consists of a time-lag overcurrent relay with inverse time characteristic. The relay may be mechanical or electronic. Its control device 12a (the relay coil) is connected into the secondary circuit of the current transformer 9. Such a design is relatively simple and may, in addition, be combined in a simple manner with an instantaneous tripping of the relay on the occasion of high overcurrents arising, for example when a short-circuit occurs in the vicinity of the capacitor bank. In the event of such faults, it is desirable that the tripping should take place immediately and not be delayed until the thermal limit value of the varistor 3 has been attained.

Figure 3:
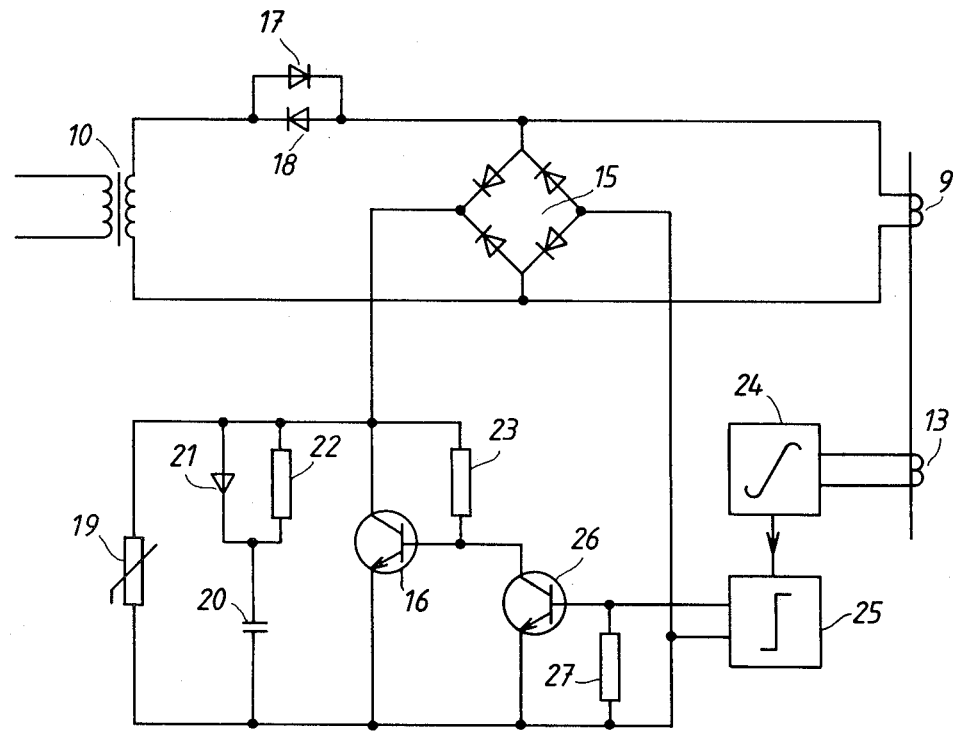
FIG. 3 is a circuit diagram of an alternative embodiment of such a trigger device equipped with an electronic switching device.

FIG. 3 shows an embodiment of the trigger device in which the short-circuiting of the secondary winding of the current transformer 9 is effected with static components only. The secondary winding of the current transformer 9 is connected to a full-wave rectifier 15, the d.c. side of which, during normal operation, is short-circuited via a transistor 16. In series with the primary winding of the pulse transformer 10 there are two anti-parallel-connected diodes 17, 18, which provide a voltage drop of the same magnitude as the voltage drop across the rectifier 15 and the transistor 16. Thus, no voltage will be supplied to the pulse transformer 10 during normal operation. In parallel across the transistor 16 there is a varistor 19 for overvoltage protection as well as a circuit consisting of a capacitor 20, a diode 21 and a resistor 22 to protect the transistor 16 from high-frequency transient voltages which may occur when the transistor changes into a non-current carrying state.

The transistor 16 is controlled from the current transformer 13 via a current integrator 24, a lever detector 25 and an additional transistor 26 which, during normal operation, is non-conducting. Between the base and the emitter of the transistor 26 there is a resistor 27 for eliminating disturbances from transient voltages.

Figure 4:
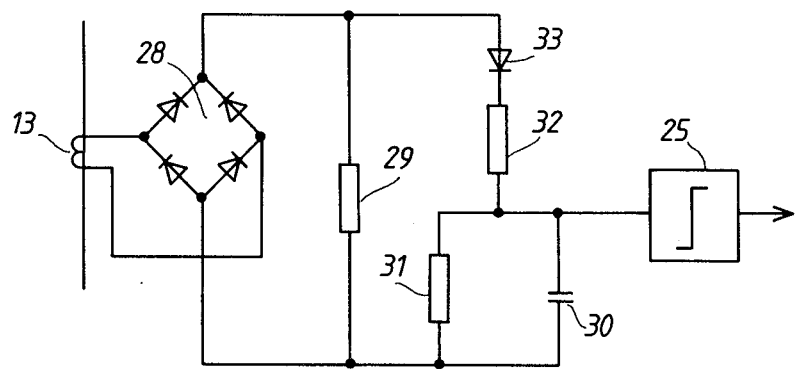
FIG. 4 is a circuit diagram of one embodiment of a current integrator included in the trigger device of FIG. 3.

FIG. 4 shows a possible embodiment of the current integrator 24. The secondary side of the current transformer 13 is connected to a full wave rectifier 28, to the d.c. side of which two parallel branches are connected, the first of which comprises a resistor 29 and the second of which comprises a capacitor 30 connected in parallel with a resistor 31 and connected in series with a resistor 32 and a diode 33. The resistor 29 is of low-ohmic value in relation to the impedance in the second parallel branch.

The rectified current charges the capacitor 30, and the capacitor voltage becomes a measure of the energy dissipated in the varistor 3. The resistor 31 is adapted so that the time constant for discharge of the capacitor 30 corresponds to the time constant with which the varistor cools down after an overvoltage. If the capacitor 30 has a leakage resistance of a suitable magnitude, the resistor 31 may be omitted.

The voltage across the capacitor 30 is supplied to the lever detector 25, which has a threshold value adapted so as to deliver signal to the transistor 26 (FIG. 3) when the varistor 3 has been utilized to its thermal limit value. When, in this way, the transistor 26 has received control current, a current circuit is established through the transistor 26 and a resistor 23 positioned between the base and the collector of the transistor 16. In this way, the voltage state of the transistor 16 is changed so that the transistor changes into a non-conducting state. This activates the pulse transformer 10 which delivers a trigger pulse to the ignition gap 11 at the time when the next mains frequency voltage half-wave across the spark gap 4 has its maximum value.

The current transformer 9 and the pulse transformer 10 may possibly be combined, for example, in a three-winding transformer with a common iron core. One winding then forms the common primary winding, and the second winding corresponds to the secondary winding of the current transformer which is normally short-circuited by the switching device 12, the third winding corresponding to the secondary winding of the pulse transformer 10.

What is claimed is:

1. A protective means for a series capacitor in a high-voltage network, said means comprising
   a voltage-dependent resistor arranged in parallel with said capacitor,
   a spark gap arranged in parallel with said resistor for shunting the latter in case of overload thereof,
   a current-sensing member for sensing the current through said resistor,
   an energy absorption detector for sensing the temperature of said resistor, and
   a pulse transformer electrically or magnetically connected to said current-sensing member, for triggering said spark gap,
   said current-sensing member, during normal operation, being short-circuited by a switching device which is controlled by said detector in such a way that the switching device is opened if the temperature of said resistor exceeds a predetermined level, whereby a trigger pulse, generated directly by the resistor current via said current-sensing member and said pulse transformer, may pass to said spark gap.

2. A protective means according to claim 1, wherein said voltage-dependent resistor is built up of zinc oxide varistors.

3. A protective means according to claim 1, wherein said current-sensing member consists of a current transformer.

4. A protective means according to claim 3, wherein said current transformer and said pulse transformer have a common iron core.

5. A protective means according to any of claims 1 to 3, wherein said switching device consists of a mechanical time-lag overcurrent relay with inverse time characteristic.

6. A protective means according to any of claims 1 to 3, wherein said switching device consists of a static time-lag overcurrent relay with inverse time characteristic.

7. A protective means according to any of claims 1 to 3, wherein said switching device consists of a bimetallic relay.

8. A protective means according to any of claims 1 to 3, wherein said switching means device comprises an electronic switch.

9. A protective means according to claim 1, wherein said switching device comprises an electronic switch and said energy absorption detector comprises capacitor means which, in the event of an overvoltage arising across said series capacitor, is charged by a current corresponding to the current flowing through said voltage-dependent resistor, the voltage across said capacitor means then constituting a measure of the amount of energy dissipated in said voltage-dependent resistor.

10. A protective means according to claim 9, wherein said capacitor means is connected in parallel with resistor means, the resistance of which is such that the discharge of said capacitor means through said resistor means takes place with a time constant which corresponds to the thermal time constant of said voltage-dependent resistor during cooling of the latter.

* * * * *